United States Patent
Johnson et al.

(10) Patent No.: US 9,034,411 B2
(45) Date of Patent: May 19, 2015

(54) METHODS OF PREPARING NO BAKE GRANOLA PRODUCT

(71) Applicant: General Mills, Inc., Minneapolis, MN (US)

(72) Inventors: Jeremy Linn Johnson, Burnsville, MN (US); Steven C. Robie, Plymouth, MN (US); Philip K. Zietlow, Wayzata, MN (US)

(73) Assignee: General Mills, Inc., Minneapolis, MN (US)

( * ) Notice: Subject to any disclaimer, the term of this patent is extended or adjusted under 35 U.S.C. 154(b) by 0 days.

(21) Appl. No.: 13/958,823

(22) Filed: Aug. 5, 2013

(65) Prior Publication Data

US 2013/0316063 A1    Nov. 28, 2013

Related U.S. Application Data

(63) Continuation of application No. 13/434,557, filed on Mar. 29, 2012, now Pat. No. 8,541,044.

(51) Int. Cl.
*A23L 1/164* (2006.01)
*A23L 1/10* (2006.01)
*A23L 1/168* (2006.01)

(52) U.S. Cl.
CPC . *A23L 1/164* (2013.01); *A23L 1/10* (2013.01); *A23L 1/168* (2013.01); *A23L 1/1643* (2013.01)

(58) Field of Classification Search
CPC ......... A23L 1/164; A23L 1/1643; A23L 1/10; A23L 1/168; A21D 2/165; A21D 2/32

USPC ................. 426/506, 520, 619, 620
See application file for complete search history.

(56) References Cited

U.S. PATENT DOCUMENTS

| | | | |
|---|---|---|---|
| 3,840,685 A * | 10/1974 | Lyall et al. ............. | 426/618 |
| 5,275,830 A | 1/1994 | Smith | |
| 5,413,805 A | 5/1995 | Delpierre, III et al. | |
| 6,720,015 B2 | 4/2004 | Prosise et al. | |
| 6,793,953 B2 | 9/2004 | Zietlow et al. | |
| 7,037,551 B2 | 5/2006 | Moore et al. | |
| 7,169,422 B2 | 1/2007 | Mesu et al. | |
| 7,264,835 B2 | 9/2007 | Funk | |
| 2004/0022901 A1 | 2/2004 | Funk | |
| 2008/0044518 A1* | 2/2008 | Johnson et al. ............ | 426/18 |

(Continued)

FOREIGN PATENT DOCUMENTS

| | | |
|---|---|---|
| EP | 1662886 A2 | 6/2006 |
| WO | WO9400025 A1 | 1/1994 |

(Continued)

OTHER PUBLICATIONS

"Cinnamon Stove Top Granola," AllRecipes.com, Powered by ESHA Nutrient Database, May 5, 2008 (1 page).

*Primary Examiner* — Helen F Heggestad
(74) *Attorney, Agent, or Firm* — Diederiks & Whitelaw, PLC; Gregory P. Kaihoi

(57) ABSTRACT

The invention generally provides novel no-bake grain products and methods of preparation of the same. Specifically a no-bake food product with a toasted appearance and flavor and a method of providing a toasted appearance and flavor to a no-bake food product. The no-bake food product includes granola bars, clusters, cereal, instant hot cereal and snacks.

20 Claims, 3 Drawing Sheets

(56) References Cited

U.S. PATENT DOCUMENTS

| | | |
|---|---|---|
| 2009/0162498 A1* | 6/2009 | McArdle et al. ................ 426/96 |
| 2010/0028507 A1 | 2/2010 | Mesu et al. |
| 2010/0183772 A1 | 7/2010 | Clanton et al. |
| 2011/0039004 A1 | 2/2011 | Garter |
| 2011/0143011 A1* | 6/2011 | Meissner ...................... 426/618 |
| 2011/0183045 A1 | 7/2011 | Froseth et al. |
| 2012/0315359 A1 | 12/2012 | Gandhi et al. |

FOREIGN PATENT DOCUMENTS

| | | |
|---|---|---|
| WO | WO2006121724 A2 | 11/2006 |
| WO | WO2007081637 A2 | 7/2007 |

* cited by examiner

METHODS OF PREPARING NO BAKE GRANOLA PRODUCT

PRIORITY CLAIM

This continuation application claims the benefit of priority of U.S. patent application Ser. No. 13/434,557 filed on Mar. 29, 2012, now U.S. Pat. No. 8,541,044, issued Oct. 3, 2013.

FIELD OF THE INVENTION

The invention relates to no-bake grain food products and the method of making no-bake grain food products.

BACKGROUND

The invention generally relates to the manufacture of granola and snack-food products, and in particular to the manufacture of ready to eat food products such as granola bars, clusters and Ready-to-Eat (RTE) snacks which comprise grain and sweetener, optionally comprising nuts, dried fruit and/or seeds.

Grain products of various formulations have long been known. One in particular is the use of dry grain products used as a hot cereal, such as oatmeal.

Traditional oatmeal is time consuming to prepare for consumption. Such hot oatmeal is typically prepared by adding water, and boiling for up to 12 minutes. Consumers are demanding convenience, such as portability and ease of preparation. Due to inefficient heat transfer in such conventional preparation methods, however, the preparation time for consumption cannot be sped up without sacrificing textural quality.

To reduce preparation time and increase the ease of preparation, hot cereal which is capable of microwave preparation is desired. In one known method, a grain product is provided which requires the addition of water and heat to make a instant oatmeal. However, this method has the limitation of providing a bland grain product without enhanced flavor and color. In an known method, color can be enhanced by adding colorants, but this does not provide the improved taste.

There is a need for instant hot cereal which require only the addition of heat for consumption. Additionally, an instant hot cereal should provide the same quality as traditionally prepared hot cereal, such as traditional oatmeal. Therefore, in view of the increased appreciation of the beneficial effects of grain products, it is desirable to improve the efficiency, convenience and results of consumer preparation of such grain products without sacrificing quality or flavor. Moreover, improved taste and manufacturing methods are desirable to meet market demands and provide alternative taste and texture to a consumer.

In a known method of making snack-food products, such as granola bars, the two basic ingredients are a binder which is typically a sugar solution and dried components such as nuts, dried fruit and/or cereal products. These ingredients are thoroughly mixed and then formed into large sheets which are transferred into a drying/baking oven. Whilst passing through or in the drying/baking oven, moisture is removed from the sugar solution binder and also from the components of the snack-food product, resulting in a sheet of dried and or baked, adhered components which can then be removed from the oven and cut into the desired sizes and shapes of the snack-food product. Such a method is described in U.S. Pat. No. 7,169,422 which is incorporated herein by reference in its entirety.

In the known method, the step of drying and baking the sheet of adhered components in the drying/baking oven is particularly time-consuming and typically is the rate-limiting step in the process that holds up the whole of the rest of the production line. The drying step also requires significant amounts of energy to dry the adhered components. Furthermore, drying the components also requires an enormous amount of capital expenses, such as equipment, materials and space.

In the known method, the grain product is typically dried in a drying/baking oven. Additionally, the drying/baking step allows for the adhered components to become toasted. However, the toasting process typically results in the outer surface being toasted, while the interior portion of the adhered component remains untoasted.

It would be desirable to eliminate the need for drying the adhered components in a drying oven. It would be desirable to provide an adhered component with a uniform toasted appearance, which in turn results in a uniform taste of the adhered component.

SUMMARY

The invention provides novel products and methods. Specifically a no-bake food product with a toasted appearance is disclosed and a method of providing a toasted appearance to a no-bake food product is also disclosed. In one example embodiment, the no-bake food product comprises an unbaked grain product and a sweetener.

Although the scope of the invention is provided by the claims hereby appended, it should be understood that variations of the particular embodiments described herein incorporating the principles of the invention will occur to those of ordinary skill in the art and yet will be within the scope of the appended claims.

BRIEF DESCRIPTION OF THE DRAWINGS

The invention will be further explained with reference to the appended Figures, wherein like structure is referred to by like numerals through the several views, and wherein.

DETAILED DESCRIPTION

Figure 1:
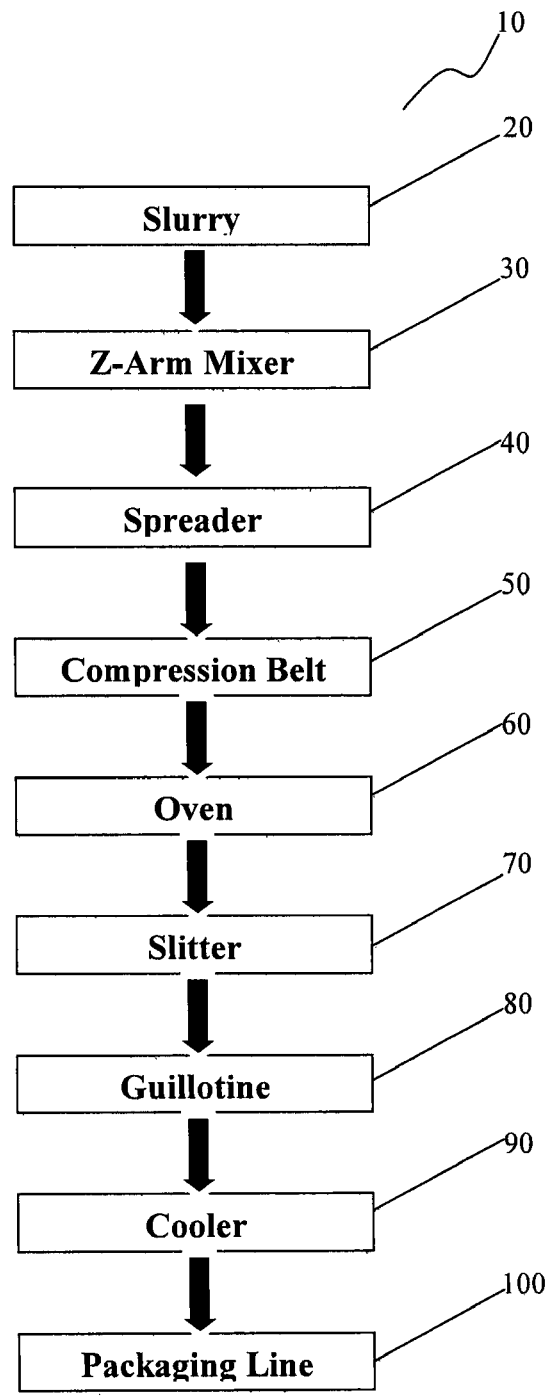
FIG. 1 illustrates a schematic flow process diagram of the prior art method of preparation of baked food products.

The invention provides novel products and methods. Specifically there is disclosed a no-bake food product with a toasted appearance and a method of providing a toasted appearance to a no-bake food product. In one example embodiment, a no-bake food product comprises an unbaked grain product and a sweetener. The optional water component can be about 1% to about 5% by weight of the no-bake grain mixture.

The invention includes a method of making a granola or snack-food product in which there is reduced wastage of material in forming the end product and can also increase production efficiency of making such products. In accordance with the invention, a method of making a granola or snack-food product comprises, mixing at elevated temperatures, ingredients for a granola or snack-food product to obtain a formable mixture, wherein a sweetener is liquid at said elevated temperature and sets when cooled to room temperature; while at an elevated temperature, whilst the sweetener is still liquid, forming the mixture into a product precursor; and cooling the product precursor to set the sweetener, thereby obtaining a no-bake food product. Thus, the sweetener is in a liquid state at an elevated temperature used for mixing of the product ingredients and sets when cooled, binding the ingredients for the product and setting to a relatively non-sticky and dry state suitable for the desired end product without further drying or processing steps. The ingredients are typically selected from the group consisting of grain, sweetener, nuts, seeds, fruit, and mixtures thereof.

Composition of No-Bake Food Product

One element of the invention is grain. The grain of the invention can comprise any suitable grain such as oats, maize, rice, barley, wheat, sorghum, millet, rye, triticale. fonio, buckwheat, quinoa, kaniwa, teff, wild rice, spelt, einkorn, emmer, durum, amaranth, flaxseed, kamut and combinations thereof. In one embodiment, the grain is oats. In another embodiment, the grain is rice. The weight percentage of grain is about 25% to about 93% of the total food product.

One element of the invention is sweetener. The sweetener of the invention can be any suitable sweetener such as brown sugar, molasses, honey, confectioner's sugar, aspartame, sucralose, saccharine, fructose, sucrose, glucose, xylitol, malitol, corn syrup and combinations thereof. In certain embodiments, the sweetener is a reducing sugar. Examples of reducing sugars such as, honey, fructose, glucose, galactose, lactose and maltose. In an embodiment, the use of at least one reducing sugar is used. In embodiments where more than one sweetener is used at least one reducing sugar in combination with a sweetener is preferred. The weight percentage of sweetener is about 0.02% to about 70% of the total food product.

In various exemplary embodiments disclosed herein, the sweetener is a sugar solution which is liquid at an elevated temperature and which is set when cooled to below about 105 degrees F. Room temperature is generally considerably below about 75 degrees F. and thus the sweetener advantageously sets such that the sweetener will not risk melting in the hand of the consumer or in storage or in transit. In an example embodiment the sweetener is set when the sweetener changes from a liquid to a solid or semi-solid. Setting temperatures of sweeteners of the various embodiments are well known by one of ordinary skill in the art.

Sugar-containing solutions are particularly suitable as a sweetener according to the invention and they can easily and inexpensively be prepared with entirely edible contents. They have a sweetness appropriate for a sweet or confectionery snack and are in wide use in this field. The sugar solutions used in embodiments described herein are characterized in that they have the properties set out above, namely that of being liquid at, or capable of being made liquid by heating to, elevated temperatures and setting when cooled to room temperature.

The properties of the sweetener are related to the concentration of sugar or sugars therein, and generally the higher the solids content of the sweetener, the higher its boiling temperature and the higher its setting temperature. Whatever concentration is adopted, suitable sweeteners are sufficiently liquid during processing and forming the desired shape of a product precursor. A product precursor is defined as a combination of components before a final food product is formed. One example embodiment of a product precursor is the mixing of grain, sweetener and water prior to heating. Another example is the heating of grain, sweetener and water prior to forming a sheet. Another example is a grain, sweetener and water after heating being formed into a sheet prior to being cut or packaged.

Generally, there is a point at which the concentration of sugar is such that no workable sweetener solution can be obtained. The sugar concentration in a sweetener should usually not exceed about 70% by weight of the entire grain mixture. The sugars in a sweetener may be selected from individual sugars and/or combinations of all edible monosaccharides and disaccharides to provide the properties described herein.

The no-bake food product described herein can also comprise additional, optional ingredients. These ingredients can be added to enhance the overall health, taste, appearance and/or texture of the no-bake food product.

Nuts. The no-bake food product may also include at least one type of nut. The nut is selected from a group consisting of peanuts, walnuts, cashews, pecans and almonds.

Seeds. The no-bake food product may also include at least one type of seed. Seeds may be selected from a group consisting of pine nuts, sunflower, sesame and flax.

Fruit. The no-bake food product may also include at least one type of fruit. The fruit is selected from a group consisting of dates, prunes, figs, apricots, peaches, apples, pears, cranberries, blueberries, strawberries, cherries, mangos, pineapples, papaya, grapes kiwi, dragon fruit and pomegranates. Fruit may be in the form of flavorants, particulates, or a layer on the final food product.

In addition to the aforementioned optional ingredients, compounds may also be added to enhance the over finished no-bake product. Although, optional ingredients such as nuts, seeds, and fruit are preferred, additional ingredients to enhance the no-bake food product can also be added. One example is the addition of sodium bicarbonate to the no-bake food product. Sodium bicarbonate may provide a leavening effect which may impart a different texture to a grain food product. Sodium bicarbonate may also impart unique flavors and colors to grain products of the invention. Sodium bicarbonate may also impart accelerated toasting a grain product.

Another optional ingredient may be food pieces. Food pieces are defined as cereal or farinaceous in nature such as corn, wheat, rice, barley and the like, and are not limited thereto, but includes any similar base food piece derived from protein, starch, fiber or combinations thereof, with or without fat and other ingredients. Many of these food pieces are made by forming a dough, either cooked or uncooked, and shaping the dough and finally toasting, baking or deep fat frying a piece to provide the finished product.

In variations of the invention, a food piece is a puffed or expanded piece fabricated from a cooked cereal dough by deep fat frying. However, the base pieces can also be supplied by a wide variety of breakfast cereal pieces such as those in the form of flake, shreds, and biscuits and puffed pieces of various shapes and sizes, e.g., spheres, rings, letters, and/or figurines. In one embodiment the base pieces are plain or uncoated. However, cereal base pieces having a pre-sweetener coating or vitamin slurry can also be utilized.

Other ingredients may also be included in the no-bake food product in accordance with usual practice in this field, such as salts, preservatives, colorings, artificial flavors, natural flavors and antioxidants.

In an alternative embodiment, the grain mixture comprises the addition of water after toasting. Once the grain mixture is sufficiently toasted, water is added to the grain mixture. The grain mixture and water are continuously agitated until substantially all water is absorbed in said grain mixture. The grain mixture is then moved to a cooler wheel. Once sufficiently cooled, the grain mixture is moved to a packaging line where the grain mixture is portioned and packaged.

Process of Making a No-Bake Granola Product

A method described herein is suitable for the manufacture of snacks such as "granola" bars from ingredients such as nuts, fruit, dried fruit, cereals, and grain products. The ingredients can be mixed at a temperature of 200 degrees F. or higher, though not so high as to risk caramelization or burning of the sweetener. A method of making a food product is also suitable for manufacture of breakfast cereals. In the case of breakfast cereals, the mixture is typically formed into a product precursor that is a natural-shaped cluster of ingredients. For manufacture of products such as granola bars the product precursor is bar-shaped; e.g. rectangular A method of making a no-bake granola bar, in one example embodiment, comprises a grain component and admixing a sweetener to said grain component. The weight percentage of sweetener is generally about 0.02% to about 70% of the final food product. The elevated temperature at which the sweetener is in a liquid state and is sufficiently liquid for no-bake food product ingredients to be mixed with the sweetener by conventional mixing equipment is at about 200° F., alternatively can be at about 240° F. or at about 250° F. Generally, the sweetener, grain and optional ingredients are at substantially the same temperature during mixing, so that the sweetener remains liquid during mixing and does not set until the product precursor has been formed and then cooled.

In this example embodiment, the elevated temperature of the ingredients is raised in a container (or heating device) with a surface temperature from about 200° F. to about 500° F. This elevated surface temperature provides a substantially uniform toasting of all ingredients. Toasting can be evidenced by a darkened color on the grain portions of the mixture, a generally golden color, and a toasted smell. Additionally, the invention defines toasted as having an L* value of about 50 to about 64, an a* value of about 4 to about 9, and a b* value of about 18 to about 21, when measured on the L*a*b* color space scale. In one example embodiment, at least 60% of the grain mixture will comprise a L* value of about 50 to about 64, an a* value of about 4 to about 9, and a b* value of about 18 to about 21. In another embodiment, at least 70% of the grain mixture will comprise a L* value of about 50 to about 64, an a* value of about 4 to about 9, and a b* value of about 18 to about 21. In yet another example embodiment, at least 80% of the grain mixture will comprise a L* value of about 50 to about 64, an a* value of about 4 to about 9, and a b* value of about 18 to about 21. In an exemplary embodiment substantially all of the grain mixture will comprise a L* value of about 50 to about 64, an a* value of about 4 to about 9, and a b* value of about 18 to about 21.

Referring now to FIG. 1, is described a method of making a baked food product. A flow chart shows the process for forming segmented granola bars pursuant to the prior art method. The prior art method 10 first comprises food ingredients mixed into a grain mixture 20 and the grain mixture is placed in a mixer 30, spread with an APV spreader 40 and formed into a slab on a compression belt 50. The grain mixture is formed from food ingredients commonly used in ready to eat baked food products. In one embodiment, a binder syrup can also be used with supersaturated sugar solutions, one example of this method is found in U.S. Pat. No. 7,169,422.

After the grain mixture is placed through an APV spreader 40, the grain mixture is next compressed with compression rollers (not shown) on a compression belt 50 to a desired thickness. The grain mixture is then baked in an oven 60.

Baking can be practiced in any commercial or noncommercial oven depending on batch size capable of maintaining the required temperature for the required time. Commercial ovens include band or continuous conveyor ovens such as those manufactured and distributed by Proctor & Schwartz, Werner Lahara and Spooner. A typical commercial oven will have multiple zones; a first zone to rapidly heat the product, a second zone to remove moisture and bake the product developing color and flavor and third zone to remove additional product moisture. In one embodiment, the grain mixture is baked for a prolonged period in an oven to remove the extra water to make a crunchy granola bar. In one embodiment, the granola pieces are transported through the oven on a sheet metal conveyor made of solid carbon steel. In another embodiment, the baking process is carried out at a sufficiently low temperature to dry the chewy granola, but not to overly modify or cook the same. This can be accomplished by drying the granola in an oven for 5-15 minutes at a temperature of less than about 400° F. Alternatively, the baking is achieved by baking for about 10 minutes at 370° F. in the oven 60. In an alternative method, the prior art describes ingredients being dried in an oven 60 for 10-20 minutes at a temperature greater than 250° F. The grain mixture is then placed through a slitter 70 to form strips of finished baked product. The grain mixture is then placed in a guillotine cutter 80. After cutting, the grain mixture, in the form of bar or pieces, run along a cooler 90. The pieces or bars are then run along a packaging line 100 and placed in wrapper or containers appropriate for storing a finished product.

Figure 2:
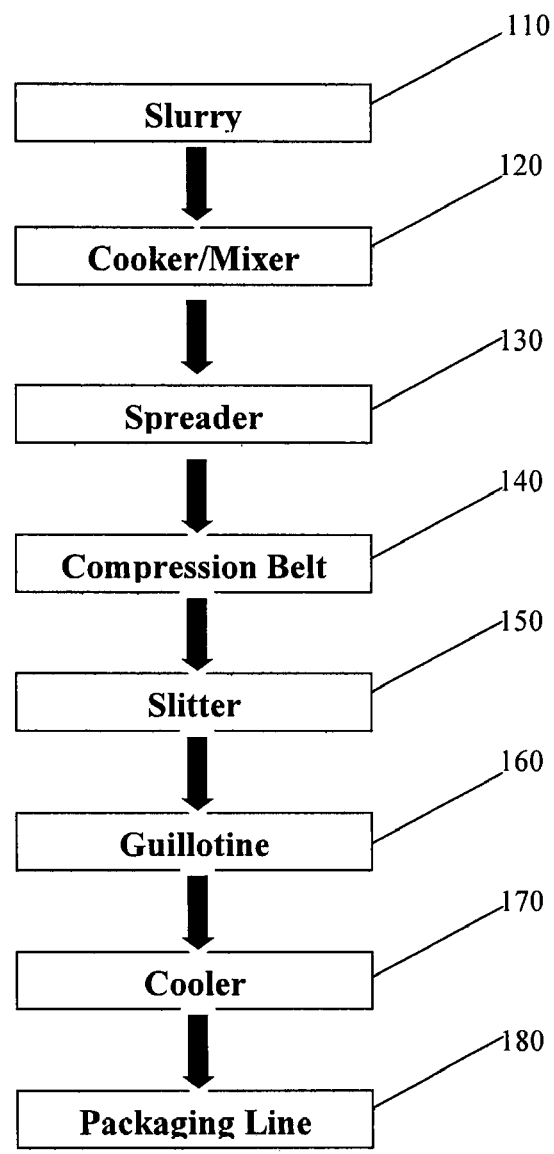
FIG. 2 illustrates a schematic flow process diagram of one embodiment of a method of the invention for preparing a granola product.

One example embodiment of the invention is shown in FIG. 2. FIG. 2 illustrates an example embodiment to process food product ingredients. This figure is shown for purposes of illustration and is non-limiting in nature. The invention provides the use of high surface temperature and substantially continuous agitation of the grain mixture to provide a substantially uniform toasting appearance to the grain mixture. However, the this should not be overshadowed by the different ways mixing or combining compositional elements of the grain mixture are described herein.

Referring again to FIG. 2, which illustrates one example embodiment of the invention the grain and sweetener are mixed together to form a grain mixture slurry 110. Additional optional ingredients may be added during any point in the mixing step of the process of the invention. The grain mixture is placed in a cooker or mixer (hereinafter mixer) 120. The grain mixture at this stage is between ambient temperature (typically 70° F.), and an elevated temperature of 250° F. In this example embodiment of the invention can use any type of mixer that provides heat and agitation to the grain mixture. A continuous flow interrupted paddle mixer can also be used in other embodiments. Alternatively, the mixing step takes place in a bowl of a mixer equipped with a media jacket for heating the contents of the mixing bowl. A media jacket such as a steam jacket, oil jacket or electric jacket are within the scope of the invention. Any mixer with the ability to obtain a surface temperature of between 200° F. and 500° F. is within the scope of the invention.

The mixer is also used to provide agitation to the grain mixture to prevent the grain mixture from charring or burning during the mixing process step, although mixing speeds necessary to perform the toasting process of the invention depends on the surface temperature of the mixing container. Additionally, the mixer should provide agitation sufficient to provide a substantial portion of the grain mixture come into contact with the mixing container surface, to provide a consistent toasting of the substantial portion of the entire grain mixture batch. Once the grain mixture is sufficiently toasted, the grain mixture is moved to a spreader 130. Toasting in the mixture is determined by the appearance of the grain mixture. Toasted grain mixture is defined as having an L* value of about 50 to about 64, an a* value of about 4 to about 9, and a b* value of about 18 to about 21, when measured on the L*a*b* color space scale. In one example embodiment, at least 60% of the grain mixture will comprise a L* value of about 50 to about 64, an a* value of about 4 to about 9, and a b* value of about 18 to about 21. In another embodiment, at least 70% of the grain mixture will comprise a L* value of about 50 to about 64, an a* value of about 4 to about 9, and a b* value of about 18 to about 21. In yet another example embodiment, at least 80% of the grain mixture will comprise a L* value of about 50 to about 64, an a* value of about 4 to about 9, and a b* value of about 18 to about 21. In an exemplary embodiment substantially all of the grain mixture will comprise a L* value of about 50 to about 64, an a* value of about 4 to about 9, and a b* value of about 18 to about 21.

The next method step, in this example embodiment, comprises transferring the grain mixture to a spreader 130. The spreading can be accomplished by a commercially available depositor or manually. In this example embodiment the product is deposited in a uniform depth of about 7.6-12.7 cm. (3-5 inches). Depositing the toasted grain mixture in such a uniform manner will allow for more precise and more consistent quality in the finished product. In a manual operation, toasted grain mixture can be deposited on baking sheets alone or lined with baking parchment paper and spread to a uniform depth for optional compression. If the desired end product of the grain mixture is granola bars, then included in the depositing step can be a compressing sub-step to a uniform thickness and to form a slab or continuous ribbon of granola. Compression is easily accomplished through the use of smooth heavy rollers or smooth rollers applied with constant pressure to the toasted granola mixture after it is deposited. In an embodiment, the grain mixture is pressed into molds.

The next optional method step includes passing the compressed grain mixture through a slitter 150 and a subsequent guillotine 160. It is appreciated that one of ordinary skill in the art could use several known methods to perform the cutting step with any type of cutter such as a traditional guillotine cutter or rotary cutter.

The next optional step comprises the grain mixture being cooled by a cooler device 170. Cooler 170 as taught herein may be cooling fans blowing ambient or chilled air over the granola product. The granola pieces are then transported along conveyor belts to be packaged along a packaging line 180. In one embodiment, the granola pieces are packaged in packages typical in the food industry, such as individually packaged ready to eat bars.

Figure 3:
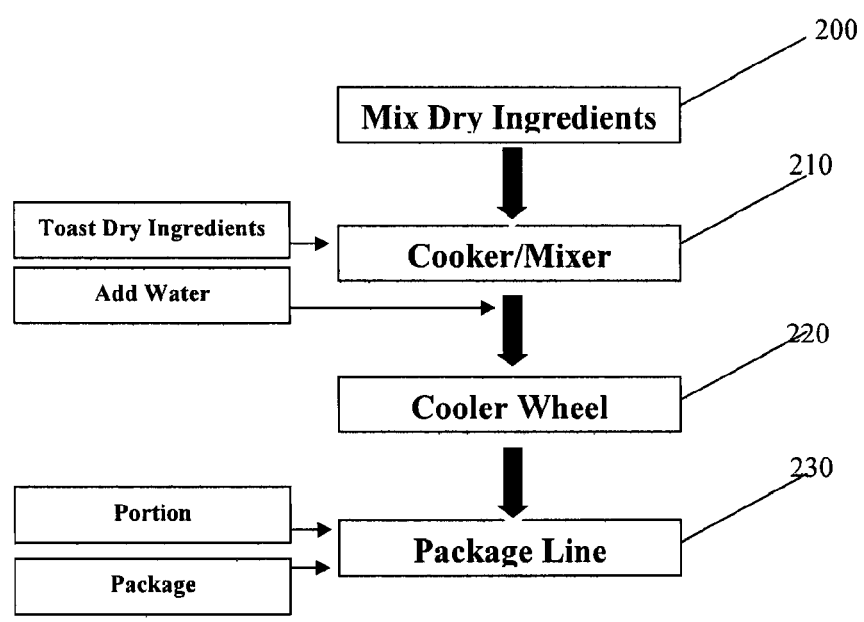
FIG. 3 illustrates a schematic process flow diagram of an alternative embodiment of a method of the invention for preparing a granola product, as shown in FIG. 2, involving adding water to the no-bake grain mixture.

Referring now to FIG. 3, which illustrates one embodiment of the invention, the grain and sweetener are mixed together to form a grain mixture slurry 200. Additional optional ingredients may be added during any point in the mixing step of the process of the invention. The grain mixture is placed in a cooker or mixer (hereinafter mixer) 210. The grain mixture at this stage is between ambient temperature (typically 70° F.), and an elevated temperature of 250° F. The invention can use any type of mixer that provides heat and agitation to the grain mixture. A continuous flow interrupted paddle mixer can also be used in another embodiment. Alternatively, the mixing step takes place in a bowl of a mixer equipped with a media jacket for heating the contents of the mixing bowl. A media jacket such as a steam jacket, oil jacket or electric jacket are within the scope of the invention. A heated paddle mixer may also be used. A mixer with the ability to obtain a surface temperature of between 200° F. and 500° F. is within the scope of the invention.

In this example embodiment, the mixer provides agitation to the grain mixture to prevent the grain mixture from charring or burning during the mixing process step. Although mixing speeds necessary to perform the toasting process of the invention depend on the surface temperature of the mixing container, a mixer that can adequately mix substantial portion of the contents of the batch of grain mixture is preferred. Additionally, the mixer should provide agitation sufficient to enable a substantial portion of the grain mixture to come into contact with the mixing container surface, to provide a consistent toasting of the substantial portion of the entire grain mixture batch.

Toasting in the mixture is determined by the appearance of the grain mixture. Toasted is defined as having an L* value of about 50 to about 64, an a* value of about 4 to about 9, and a b* value of about 18 to about 21, when measured on the L*a*b* color space scale. In one example embodiment, at least 60% of the grain mixture will comprise a L* value of about 50 to about 64, an a* value of about 4 to about 9, and a b* value of about 18 to about 21. In another embodiment, at least 70% of the grain mixture will comprise a L* value of about 50 to about 64, an a* value of about 4 to about 9, and a b* value of about 18 to about 21. In yet another example embodiment, at least 80% of the grain mixture will comprise a L* value of about 50 to about 64, an a* value of about 4 to about 9, and a b* value of about 18 to about 21. In an exemplary embodiment substantially all of the grain mixture will comprise a L* value of about 50 to about 64, an a* value of about 4 to about 9, and a b* value of about 18 to about 21.

In an alternative embodiment, once the grain mixture is sufficiently toasted, water is added to the grain mixture. The grain mixture and water are continuously agitated until substantially all loose water is absorbed in said grain mixture. The grain mixture at this point has a paste-like or thickened consistency. The grain mixture is immediately moved to a cooler wheel 220.

The next optional method step comprises the grain mixture being moved to a packaging line 230, where the grain mixture is portioned and packaged. In one example embodiment, the packaging is a paper container available for freezing, where the container is a single-serving portion. In an alternative embodiment, the package is a plastic container for a single serving portion. Although single-serving containers are preferred, any container suitable for packaging food-products are within the scope of the invention. Containers that are safe for use in freezing food products and microwaving food-products are especially preferred.

While the invention has been particularly shown and described with reference to a preferred embodiment, it will be understood by those skilled in the art that various changes in form and detail may be made therein without departing from the spirit and scope of the invention. For example, the dimensions may be changed to increase or decrease the overall size of the grain mixture pieces and the grain mixture composition may be varied to adjust the texture and flavor of the final product, and to accommodate various flavor combinations, inclusions, and/or fillings.

TABLE

*The following examples are exemplary and are meant as illustrations and non-limiting in nature.*

| | Ex. 1 | Ex. 2 | Ex. 3 | Ex. 4 | Ex. 5 | Ex. 6 | Ex. 7 | Ex. 8 | Ex. 9 | 10 | Ex. 11 |
|---|---|---|---|---|---|---|---|---|---|---|---|
| Ingredients | | | | | | | | | | | |
| Rolled Oats | 100 | 100 | 33 | 60 | 33 | 20 | 10 | 10 | 10 | 10 | 10 |
| Quick cook rolled oats | | | 33 | 40 | 33 | 40 | 45 | 45 | 45 | 45 | 45 |
| Quick cook steel cut oats | | | 33 | | 33 | 40 | 45 | 45 | 45 | 45 | 45 |
| Sweetener | 42 | 38 | 35 | 35 | 30 | 25 | 20 | 20 | 15 | 15 | 20 |
| Canola Oil | 20 | 20 | 20 | 20 | 20 | 15 | 15 | 12 | 15 | 15 | 15 |
| Refiners syrup | 11 | 6 | 7 | 6.5 | 5 | 4 | 3 | | 3 | 3 | 3 |
| Salt | 1.2 | 1.4 | 1.4 | 1.4 | 1.4 | 1.4 | 1.4 | 1.7 | 1.6 | 1.25 | 1.4 |
| Sodium Bicarbonate | 0.4 | 0.5 | 0.5 | 0.4 | 0.4 | 0.4 | 0.4 | 0.4 | 1.4 | 1.4 | |
| water | | | | | | | | | | | 400 |
| total weight (g) | 174.6 | 165.9 | 162.9 | 163.3 | 155.8 | 145.8 | 139.8 | 134.1 | 136 | 135.65 | 539.4 |
| Optional Ingredients | | | | | | | | | | | |
| Nuts | | | | | | | | | | walnuts | |
| Fruit | | | | | | | | | apples | cranberries | |

What is claimed is:

1. A method of preparing a no bake food product comprising:
   A. providing an unbaked grain product, wherein said unbaked grain product has not been previously heated at temperatures above 200 degrees Fahrenheit;
   B. adding a sweetener and sodium bicarbonate to said unbaked grain product to form a grain mixture;
   C. agitating said grain mixture in a container while heating, until said grain mixture is toasted, wherein the surface of said container is about 200 degrees to about 500 degrees Fahrenheit; and
   D. forming the toasted grain mixture into the no bake food product.

2. A method of claim 1, further comprising the step of removing said grain mixture from heat when said grain mixture reaches a temperature of at least above 240 degrees Fahrenheit.

3. The method of claim 2, wherein the grain mixture is toasted so as to have a water content of about 0.01% to about 5%.

4. The method of claim 1, further comprising the step of forming said grain mixture into a sheet.

5. The method of claim 1, further comprising the step of separating said grain mixture into pieces, wherein said pieces are selected from a group consisting of bars, clusters, and cereal.

6. The method of claim 1, further comprising adding water to said grain mixture after said mixture is toasted, and further agitating said grain mixture until substantially all water is absorbed in said grain mixture.

7. The method of claim 6, wherein said water is about 25% to about 90% by weight of said grain mixture.

8. The method of claim 1, furthering comprising the step of adding oil to said unbaked grain product, wherein said oil is selected from a group consisting of canola, corn, sunflower, olive, peanut, almond, walnut, soybean, rice bran, coconut, butter, margarine and palm.

9. The method of claim 8, wherein said oil is about 0.25% to about 30% by weight of the grain mixture.

10. The method of claim 1, further comprising the step of adding syrup to said unbaked grain product, wherein said syrup in selected from a group consisting of refiner's syrup, maple syrup, corn syrup, inulin syrup, malt syrup, sorghum syrup, oat syrup, rye syrup, wheat syrup, maize syrup, rice syrup and barley syrup.

11. The method of claim 1, further comprising the step of adding juice to said unbaked grain product, wherein said juice is selected from a group consisting of the juice from dates, prunes, figs, apricots, peaches, apples, pears, cranberries, blueberries, strawberries, cherries, mangos, pineapples, papaya, grapes, kiwi, dragon fruit and pomegranates.

12. The method of claim 1, further comprising the step of adding salt to said grain mixture wherein said salt is about 0.01% to about 10% by weight of the grain mixture.

13. The method of claim 1, wherein said grain mixture is measured on the L*a*b* color space while being toasted or thereafter, and wherein about 100% of said of grain mixture having a L* value of about 50 to about 64, an a* value of about 4 to about 9 and a b* value of about 18 to about 21.

14. The method of claim 1, wherein said grain product is selected from a group consisting of oats, maize, rice, barley, wheat, sorghum, millet, rye, triticale, fonio, buckwheat, quinoa, kaniwa, teff, wild rice, spelt, einkorn, emmer, durum, amaranth, flaxseed and kamut.

15. The method of claim 14, wherein said grain product is gluten-free.

16. The method of claim 1, wherein said sweetener is selected from a group consisting of brown sugar, molasses, honey, confectioner's sugar, aspartame, sucralose, saccharine, fructose, sucrose, glucose, xylitol, malitol and corn syrup.

17. A method of claim 1, further comprising the step of adding nuts to said grain mixture, wherein said nuts are selected from a group consisting of peanuts, walnuts, cashews, pecans and almonds.

18. The method of claim 1, further comprising the step of adding seeds to said grain mixture, wherein said seeds are selected from a group consisting of pine nuts, sunflower, sesame and flax.

19. The method of claim 1, further comprising the step of adding fruit to said grain mixture, wherein said fruit is selected from a group consisting of dates, prunes, figs, apricots, peaches, apples, pears, cranberries, blueberries, strawberries, cherries, mangos, pineapples, papaya, grapes, kiwi, dragon fruit and pomegranates.

20. The method of claim 1, wherein the sweetener is about 0.02% to about 70% by weight of the food product.

\* \* \* \* \*